(12) United States Patent
Warren

(10) Patent No.: US 6,249,875 B1
(45) Date of Patent: Jun. 19, 2001

(54) INTERFACE CIRCUIT USING PLURALITY OF SYNCHRONIZERS FOR SYNCHRONIZING RESPECTIVE CONTROL SIGNALS OVER A MULTI-CLOCK ENVIRONMENT

(75) Inventor: Robert Warren, Thornbury (GB)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/164,227

(22) Filed: Sep. 30, 1998

(30) Foreign Application Priority Data

Sep. 30, 1997 (GB) .................................................. 9720811

(51) Int. Cl.[7] ........................................................ G06F 1/12
(52) U.S. Cl. .............................. 713/400; 713/600; 710/58
(58) Field of Search ................................... 713/400, 401, 713/500, 501, 502, 503, 600, 601; 710/37, 20, 29, 52, 58, 61; 370/110.1; 395/112; 360/32

(56) References Cited

U.S. PATENT DOCUMENTS

| | | | |
|---|---|---|---|
| 4,381,525 | * 4/1983 | Senoo et al. | 360/32 |
| 4,769,792 | * 9/1988 | Nogami et al. | 365/222 |
| 4,805,171 | * 2/1989 | Ewell | 370/110.1 |
| 5,029,124 | * 7/1991 | Leahy et al. | 364/900 |
| 5,099,477 | * 3/1992 | Taniguchi et al. | 370/97 |
| 5,146,477 | * 9/1992 | Cantoni et al. | 375/112 |
| 5,150,201 | * 9/1992 | Mehrgardt et al. | 358/23 |
| 5,379,384 | * 1/1995 | Solomon | 395/325 |
| 5,469,851 | * 11/1995 | Lipschutz | 128/661.01 |
| 5,509,038 | * 4/1996 | Wicki | 375/371 |
| 5,537,362 | * 7/1996 | Gill et al. | 365/233.5 |
| 5,673,004 | * 9/1997 | Park | 331/1 A |
| 5,822,341 | * 10/1998 | Winterrowd et al. | 371/43.7 |
| 5,898,442 | * 4/1999 | Takebe | 345/507 |
| 5,933,580 | * 8/1999 | Uda et al. | 395/112 |
| 5,948,080 | * 9/1999 | Baker | 710/37 |
| 6,088,272 | * 7/2000 | Urata et al. | 365/194 |

OTHER PUBLICATIONS

Method of Data Sychronization On An Asynchronously Clocked Interface, *IBM Technical Disclosure Bulletin*, 32(10A), pp. 345–348, Mar. 1, 1990.

Muegge and Chenoweth, 36 Bit Wide FIFO for Deep, Bus Oriented Applications, *Conference Record of Northcon, Seattle*, pp. 351–354, Oct. 11–13, 1994.

Description Of The Service Interface Of The IBM Wireless LAN Card, *IBM Technical Disclosure Bulletin*, 38(7), pp. 405–407, Jul. 1, 1995.

Clocked Bidirectional First–In, First–Out Memory, *Texas Instruments SN54ACT3632 Datasheet*, pp. 1–9, Sep. 1996.

* cited by examiner

*Primary Examiner*—Thomas Lee
*Assistant Examiner*—Ri Jue Mai
(74) *Attorney, Agent, or Firm*—Theodore E. Galanthay; E. Russell Tarleton; Seed IP Law Group PLLC

(57) ABSTRACT

Circuitry is described for transferring information from a first timing environment to a second timing environment. The circuitry comprises a dual port RAM having a first port which is responsive to a first timing signal and a second port which is responsive to a second timing signal, a first control circuit which is responsive to the first timing signal, for controlling storage of data in the dual port RAM through the first port and for generating a control signal indicating that data is stored in the dual port RAM. The circuitry also comprises a synchronizer for synchronizing the control signal to the second timing signal, and a second control circuit, which is responsive to the second timing signal and the synchronized control signal and is for controlling retrieval of stored data through the second port of the dual port RAM.

32 Claims, 2 Drawing Sheets

INTERFACE CIRCUIT USING PLURALITY OF SYNCHRONIZERS FOR SYNCHRONIZING RESPECTIVE CONTROL SIGNALS OVER A MULTI-CLOCK ENVIRONMENT

TECHNICAL FIELD

The present invention relates to circuitry for transferring information across a clock boundary between different clock environments, and in particular such circuitry in which a dual port RAM is utilized.

BACKGROUND OF THE INVENTION

In single chip integrated circuits, especially those designed using synchronous design techniques, there are many applications where more than one clock is required. Consideration must be given to any control or data signals which pass from any one clock environment to any other clock environment.

Consider a single bit of a data or control signal arriving from a first clock environment, at the input of a clocked storage element or latch of a second clock environment. Depending on the timing of a change in the single bit of the data or control signal (the timing of which is determined by the first clock environment), there are three possibilities as to whether the single bit of the data or control signal will be stored or "captured" in the clocked storage element of the second clock environment. The three cases are:

i) If the data changes well before the significant clock edge of the second timing environment, then the data is captured and transferred to the latch output shortly after the clock edge of the second timing environment;

ii) If the data changes just after the significant clock edge of the second timing environment, then there is no change to the latch output until the next clock edge of the second timing environment; or iii) If the data changes close to the significant clock edge of the second timing environment, then the data may be captured on that clock edge and transferred to the latch output shortly after the clock edge, or the data may not be captured without any change to the latch output until after the next clock edge of the second timing environment. Furthermore, there is a finite probability that the latch will enter a "meta-stable" condition where the data is not cleanly captured and the output is liable to change an undetermined time after the clock edge of the second timing environment.

If the latch does enter the meta-stable condition described in (iii), then the delay before the output changes could be longer than one clock cycle depending on the clock frequencies and design of the latch. This means that the output of the latch is indeterminate, the output from successive latches in the design could also be indeterminate, and the collective state of the entire chip rapidly becomes indeterminate.

The effects of metastability can never be completely removed, no matter what technology is used, since it is a fundamental principle of decision making. However, with reasonable design techniques, the probability of metastability propagating in an undesirable manner, can be reduced to an acceptable level. Such acceptable levels may range from the probability of one failure in a year to one failure in an entire product range in a century. This is even more important when there is no relationship between the two clocks and they are said to be asynchronous with respect to each other. Even if two clocks are running at nominally the same frequency, if they have been derived from independent sources then, however tight the tolerances on the frequencies are, the clocks are likely to be drifting with respect to each other.

A known technique for passing a single bit of information between clock environments is to use a special latch which is designed to minimize the effects of metastability, commonly known as a synchronizer. If the time period for an acceptable probability of propagated metastability is longer than one clock cycle, then synchronizers are joined in series such that the output of the last synchronizer has an acceptable probability of failure.

There are many techniques for passing control information between clock environments. The choice of technique depends on the ranges of the clock frequencies of the environments. The cost of the control synchronization may be measured in terms of the delay, or latency, in passing the control information and in terms of the number of synchronizers involved. Typically the number of control signals passed across a clock environment boundary is minimized.

In order to minimize the number of signals which have to pass through synchronizers, only a few control signals pass through the synchronizers and the remainder of the control signals are treated as data. A typical control signal passing in the same direction as the data across the clock boundary may indicate that the data is stable, and a typical control signal passing in the opposite direction may indicate the data has been accepted.

If the data being passed across the clock environment boundary is stable when it is being clocked into the receiving clock environment, then it does not suffer from metastability and does not need to pass through synchronizers. However, the data must remain stable and not change from some time before the control signal indicates that the data is stable up until the control signal in the opposite direction, after it has passed through its synchronizer, indicates that the data has been accepted. This means that the data must be stored and remain unchanged for many clock cycles. If the desired data transfer rate is slower than this number of clock cycles, there is no problem. However, as is more usual, there may be new data arriving at every clock cycle.

For every data bus width of data arriving at every clock cycle, it is possible to arrange the data arriving in several successive cycles to be stored and transferred across a significantly wider bus width. For example, if the width of the data bus is 8 bits, namely a byte, then each byte can be stored until there are 8 bytes, then these 8 bytes transferred across the clock boundary using a 64-bit bus for example.

While the first 8 bytes are being held stable for transfer across the clock boundary, further bytes could be arriving. These further bytes have to be stored separately. For given data rates, the ranges of each of the clock frequencies, the delays of the synchronizers, and the overall latency of the control protocol used, it is possible to determine how much storage is necessary to support the maximum sustainable data rate.

If the protocol latency is 8 cycles and the width of the data bus is 8 bits, then the width of the data bus crossing the clock boundary must be 64 bits. This 64 bits must be held in some storage so that it is stable whilst it is crossing the clock boundary. Thus the amount of storage required is:

(Protocol Latency)×(bus width)

Since new data, on the 8 bit bus, may continue to arrive while the 64 bits are being held stable for crossing the clock boundary, this new data must be stored somewhere, and thus the amount of storage required is:

2×(Protocol Latency)×(bus width)

A similar scheme is also required in the second clock environment. One 64 bits worth of buffering to capture the data passed across the boundary, and a second 64 bits of buffering to hold the data from the previous transfer being passed deeper into the second clock environment 8-bits at a time. Thus, the total amount of storage required on both sides of the boundary is modified to:

4×(Protocol Latency)×(bus width)

Furthermore, according to the protocol used, each synchronizer is a 1-bit data storage element, so the number of synchronizers is added to give the total storage required as:

4×(protocol Latency)×(bus width)+synchronizers

There are a number of different schemes for implementing the protocol to guarantee safe transference of data across a clock boundary. However, in each case, there is a determined protocol latency and a large amount of data storage is required.

In one prior art technique, data is stored in flip-flops prior to transmission across the clock boundary. A large number of flip-flops are needed to store the necessary volume of data, and such an arrangement is expensive in terms of the chip space consumed by the flip-flop circuits.

SUMMARY OF THE INVENTION

It is thus an object of the present invention to provide a circuit and method for transferring data and control information between clock environments which minimize the circuitry needed and chip area consumed.

Thus, according to the present invention there is provided circuitry for transferring information from a first timing environment to a second timing environment, comprising a dual port RAM having a first port responsive to a first timing signal and a second port responsive to a second timing signal, a first control circuit responsive to the first timing signal for controlling storage of data in the dual port RAM through the first port and for generating a control signal indicating that data is stored in the dual port RAM, a synchronizer for synchronizing the control signal to the second timing signal, and a second control circuit responsive to the second timing signal and the synchronized control signal for controlling retrieval of stored data through the second port of the dual port RAM.

A RAM cell is much smaller than a flip-flop cell, and thus the chip space consumed by a dual port RAM implementation is reduced over a flip-flop implementation for the same number of storage locations. Advantageously according to the present invention fewer storage locations are in any event required using a dual port RAM implementation.

Preferably the second control circuit generates a second control signal indicating that data has been retrieved from the dual port RAM, and further comprising a second synchronizer for synchronizing the second control signal to the first timing signal, wherein the first control circuit stores data in the dual port RAM responsive to the synchronized further control signal.

The present invention also provides a method of transferring information from a first timing environment to a second timing environment, comprising the steps of storing data in a dual port RAM through a first port thereof responsive to a first timing signal, generating a control signal, responsive to the first timing signal, indicating that data is stored in the dual port RAM, synchronizing the control signal to a second timing signal and retrieving data from the dual port RAM through a second port thereof responsive to the second timing signal and the synchronized control signal.

Preferably generating a second control signal, responsive to the second timing signal, indicating that data has been retrieved from the dual port RAM and synchronizing the second control signal to the first timing signal, wherein data is stored in the dual port RAM in dependence on the synchronized second control signal.

The control signal may be synchronized to the second timing signal by a plurality of synchronizers. Also, the second control signal may be synchronized to the second timing signal by a plurality of further synchronizers.

The first and second timing signals may be first and second clock signals.

The first and second timing signals may be derived from a common source. The phase relationship variance of first and second timing signals derived from the common source may be comparable or larger than the period of either timing signal.

The first and second timing signals may be asynchronous with respect to each other. The first and second timing signals, asynchronous with respect to each other, may be asynchronous or isynchronous signals.

BRIEF DESCRIPTION OF THE DRAWINGS

For a better understanding of the present invention and to show how the same may be carried into effect, reference will now be made by way of example to the accompanying drawings in which.

DETAILED DESCRIPTION OF THE INVENTION

Figure 1:
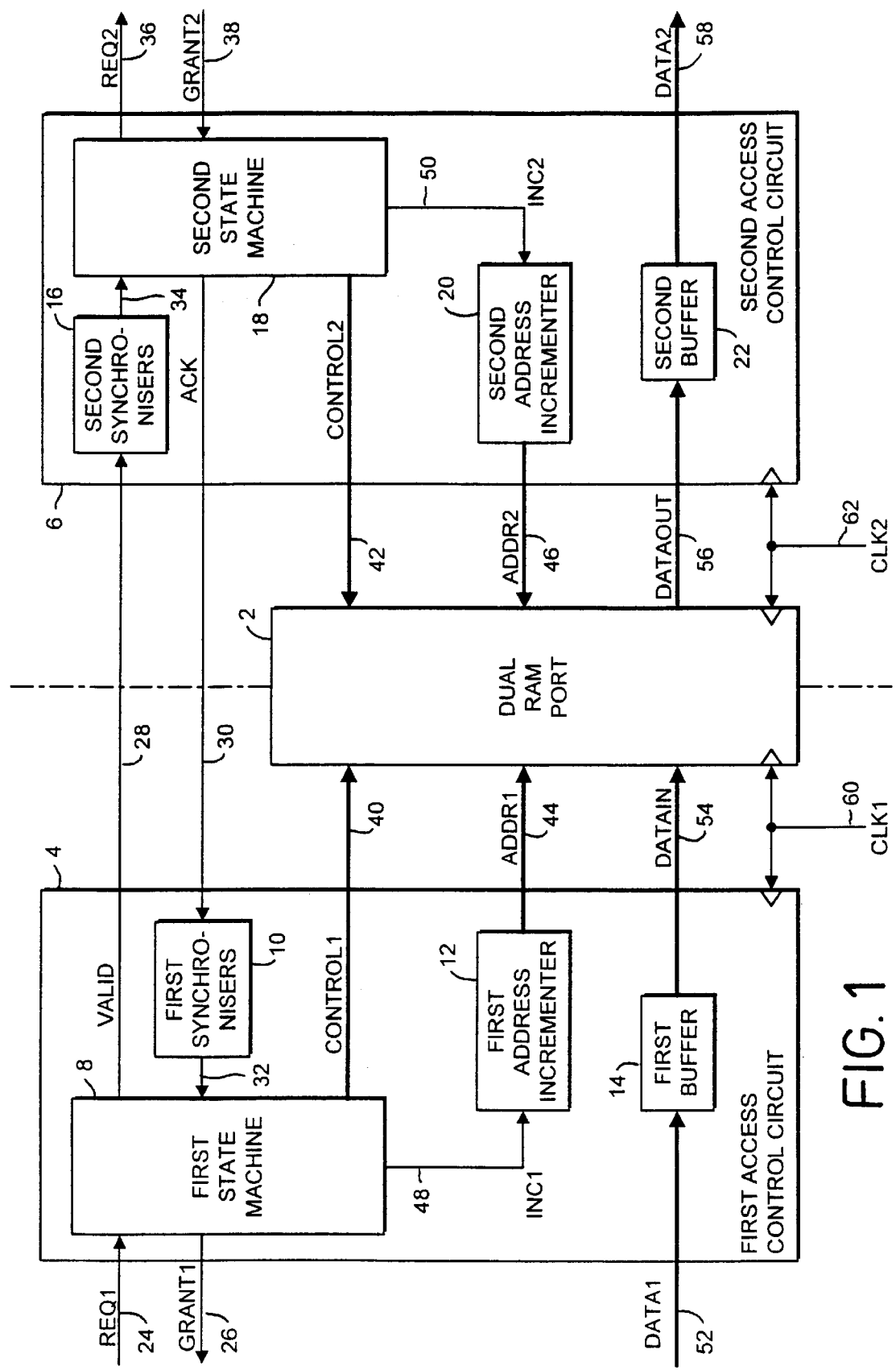
FIG. 1 is a block diagram of a dual port buffer according to an exemplary embodiment of the present invention.

Referring now to FIG. 1 there is shown an exemplary embodiment of a dual port buffer according to the present invention. The dual port buffer includes a dual port RAM 2, a first access control circuit 4 and a second access control circuit 6. The first access control circuit 4 comprises a first state machine 8, first synchronizers 10, a first address incrementer 12 and a first buffer 14. The second access control circuit 6 comprises second synchronizers 16, a second state machine 18, a second address incrementer 20 and a second buffer 22.

The first access control circuit 4, which operates in a first timing environment under the control of a clock signal CLK1, receives from a source on bus 52 data DATA1 to be transferred to a second timing environment.

The data DATA1 may pass through the optional first buffer 14 for the purpose of boosting the electrical drive of the signals or for re-timing under the control of the clock signal CLK1. The first buffer 14 outputs the data as the signals DATAIN on bus 54.

The first buffer 14 and second buffer 22 are optional. These buffers may be present for two reasons:

1. To electrically buffer the signals to present a low load to the source, or to provide sufficient drive into the destination.
2. To provide a timing adjustment (i.e., to re-time the signal) with respect to the clock, where for example the data arrives late in the cycle from the source, but is required early in the cycle by the destination.

The first access control circuit 4 also receives from the source a control signal REQ1 on line 24 which the source outputs to indicate that there is valid data to be transferred to the second timing environment. The signal REQ1 forms an input to the first state machine 8. In response to the signal REQ1, the first state machine 8 controls the transfer of the data DATA1 into the dual port RAM 2. The first state machine 8 outputs a signal INC1 on line 48 to the first address incrementer 12, and the first address incrementer increments the address value ADDR1 on bus 44 to the dual port RAM. In this embodiment, data to be transferred is stored in successive memory locations of the dual port RAM, such that for each block of data which is stored in the dual port RAM the first address incrementer 12 increments the storage address by one block. Thus, initially, the address to which the first address incrementer directs the data to be stored is an initial or base address. The first state machine 8 also outputs on bus 40 transmit control signals CONTROL1 to control the loading of the data into the selected address. Thus, under the control of the clock signal CLK1, the data DATAIN on bus 54 of the output of the first buffer is loaded into the dual port RAM at the selected address.

Once the data to be transferred has been successfully loaded into the dual port RAM, the first state machine 8 outputs a signal GRANT1 on line 26 back to the source, thereby indicating to the source that the source may begin to send a further block of data on the DATA1 bus 52. Furthermore, when sufficient data has been loaded into the dual port RAM 2, the first state machine 8 sends a signal VALID on line 28 across the clock boundary to the second access control circuit 6.

The signal VALID on line 28 is received by the second synchronizers 16 of the second access control circuit 6, and the synchronized output of the second synchronizers 16, being the signal VALID synchronized to the second clock signal CLK2, forms an input to the second state machine 18. In response to the synchronized signal VALID the second state machine 18 outputs control signals on the second control bus CONTROL2 42 to the dual port RAM 2, and outputs a signal INC2 on line 50 to the second address incrementer 20. This process is repeated according to how much data was transferred. Thus, the second state machine 18 controls the access of a data block stored in the dual port RAM at a location identified by the address ADDR2 on the address bus 46 output from the second address incrementer. As with the first address incrementer 12, in this preferred embodiment the second address incrementer, in its initial state, retrieves data blocks from a base address, and thereafter from successive address locations. Thus, the second address incrementer follows the first address incrementer such that data is first retrieved from the block to which data has first been written, and so on through successive memory access cycles. Thus the data block which has been stored in the dual port RAM by the first access control circuit 4 is output as DATAOUT on the data bus 56 and stored in the second buffer 22 under the control of the clock signal CLK2 on line 62.

Once the data block has been successfully retrieved from the dual port RAM 2, the second state machine 18 sets a signal ACK on line 30 which is transferred to the first timing environment and the first access control circuit 4. The signal ACK is received by the first synchronizers 10, and the synchronized output thereof is input on line 32 to the first state machine 8. When the first state machine 8 receives the synchronized signal ACK on line 32 it indicates that there is further space in the dual port RAM for the first access control circuit to load data into.

The second state machine 18 also outputs a signal REQ2 on line 36 to a destination circuit which the data is to be transferred to in the second timing environment, when the data block has been successfully accessed from the dual port RAM 2. This signal indicates that valid data is available on the data bus 58 on the output of the second buffer 22. When the destination circuit receives the signal REQ2 it loads therein the data DATA2 on the bus 58 and once this is done returns a signal GRANT2 on line 38 to the second state machine 18, in response to which the second state machine 18 can, if further data blocks are available in the dual port RAM 2, access these data blocks and forward them to the destination circuit.

In the embodiment of FIG. 1, it is shown that the control protocol between the two timing environments is a single signal VALID in one direction from the first timing environment to the second timing environment, and a single signal ACK in the other direction from the second timing environment to the first timing environment. However, the particular protocol that is used to control the flow of data across the timing boundary may vary considerably according to the desired application, the volume of flow of data, and the relative speeds of the two clocks of the respective timing environment. For instance, if the clock signal CLK2 in the second timing environment was much faster than the clock signal CLK1 in the first timing environment, then it is possible that the return signal of the protocol described with reference to FIG. 1, i.e., the signal ACK on line 30 could be dispensed with. However, to successfully operate such a system where there would be a single flow control signal in one direction only, i.e., the signal VALID on line 28, it would be necessary to know that the dual port buffer was going to be used in an environment where the two clocks had significantly different speeds.

It can also be appreciated that the flow control signals according to the protocol of FIG. 1, rather than being the signal signals VALID and ACK in each direction, could in fact be comprised of a plurality of signals, the flow control protocol being more complex. If the flow control signals in either direction comprised a plurality of signals, then each of such signals would have synchronizers such as the synchronizers 10 and 16 associated therewith. Each of the plurality of control signals may have one or more synchronizers, in series, associated therewith.

Depending on the protocol used, even if the control signals in both directions comprise a plurality of control signals, the number of signals in each direction may differ, for example if a different protocol is being used in each direction, or be the same.

Furthermore, either or both edges of any one of the control signals used may be active edges.

In particular, in one envisaged embodiment the dual port RAM 2 could be split into two halves, and each of the signals VALID and ACK could comprise two signals, one associated with the top half of the dual port RAM 2 and the other associated with the bottom half of the dual port RAM 2.

Figure 2:
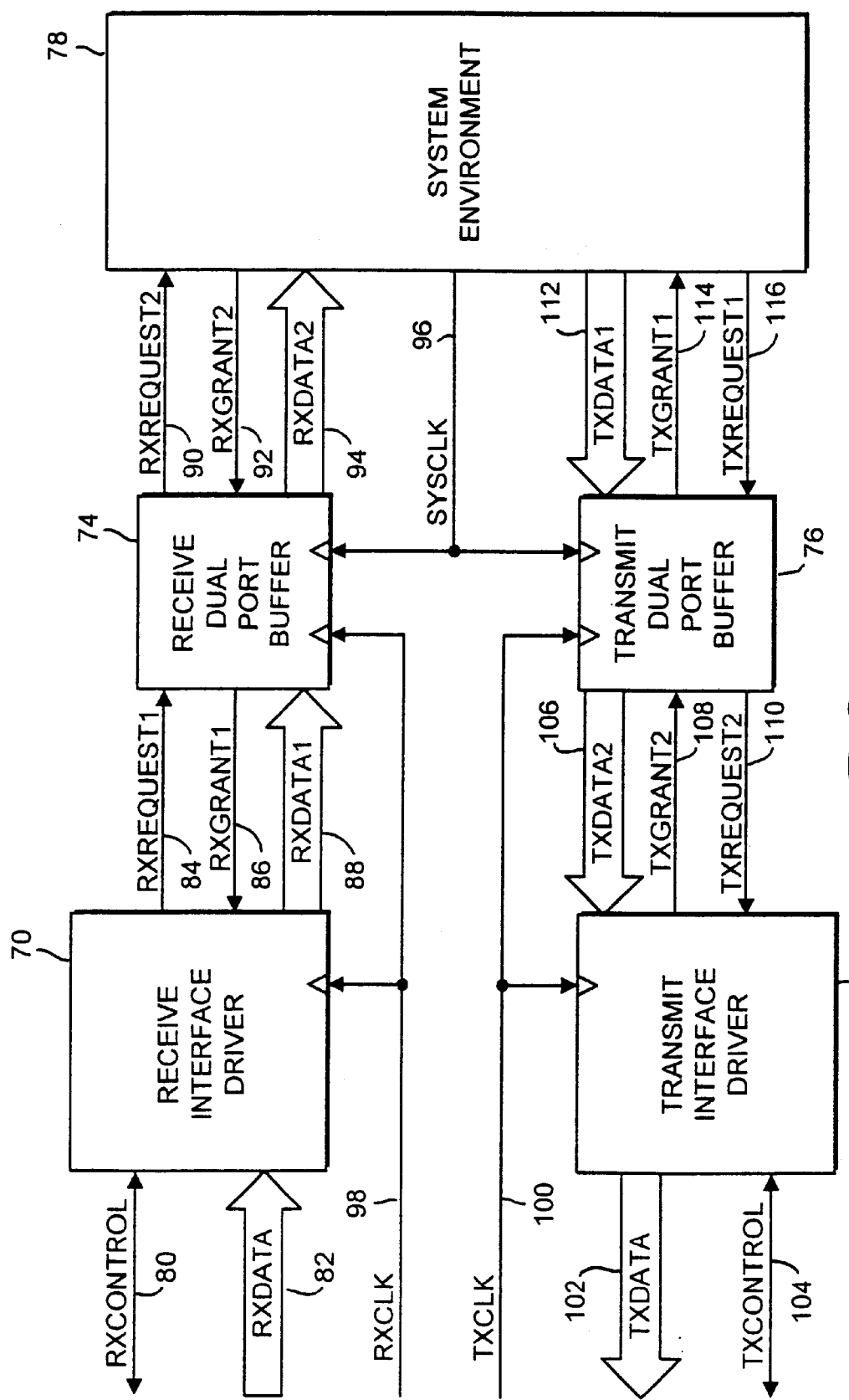
FIG. 2 illustrates an implementation of the dual port buffer of FIG. 1.

The dual port buffer described hereinabove transfers data or information in one direction only from a first clock environment to a second clock environment. In order to allow the transfer of data in the other direction from the second clock environment to the first clock environment it is necessary to provide a second dual port buffer. Referring now to FIG. 2, there is shown such an implementation where the exemplary dual port buffer described hereinabove with reference to FIG. 1 is shown duplicated for use for transmitting data to and from a system environment.

FIG. 2 illustrates the use of the dual port buffer of FIG. 1, in two instances, as an interface between, firstly, on-chip functional circuitry operating in a clock environment determined by various on-chip requirements and means, and, secondly, an off-chip data source and data sink each having separate clocks determined by off-chip requirements and possibly off-chip means.

Referring to FIG. 2 the system environment is generally designated as 78, and there is also shown therein a receive interface driver 70, a receive dual port buffer 74, a transmit dual port buffer 76 and a transmit interface driver 72. Each of the receive dual port buffer 74 and transmit dual port buffer 76 are, in the preferred embodiment, identical to the dual port buffer described hereinabove with reference to FIG. 1. The system environment 78 may include a central processor unit, a digital signal processor, or some form of specific logic circuitry.

The receive interface driver 70 receives data RXDATA on a bus 82 and protocol control signals RXCONTROL on lines 80 from a source. Under the control of a receive clock RXCLK on line 98 the receive interface driver 70 transfers the data from the source on the bus 82 to the bus 88 as data RXDATA1. As will be understood and in line with normal flow control protocol techniques, when the data is transferred to the bus 88 then the receive interface driver 70 sends flow control signals on the signals RXCONTROL on line 80 back to the source to indicate that the data has been received. The data output by the receive interface driver 70 on bus 88 as RXDATA1 is output simultaneously with the signal RX on line 84 which, as discussed hereinabove with reference to FIG. 1, is a protocol control signal. The receive dual port buffer 74 then transfers the data RXDATA1 on bus 88 from the clock environment of the clock signal RXCLK to the system clock environment on the data bus RXDATA2 on bus 94. Thus the receive dual port buffer is clocked by the receive clock RXCLK and also a system clock SYSCLK on line 96. The data RXDATA2 on the bus 94 is synchronized to the system clock SYSLCK and received in the system environment 78.

Similarly, in the reverse direction, the system environment outputs data TXDATA1 on bus 112 under the control of the system clock SYSCLK for transmission in a different clock environment on bus TXDATA2 on bus 106. The data TXDATA2 on bus 106 corresponds directly to the data TXDATA1 on bus 112 but is synchronized to a transmit clock TXCLK on line 100. Again, the transmit dual port buffer 76 operates in identical fashion to that described with reference to FIG. 1. Again, the data TXDATA2 on bus 106 is transmitted by the transmit interface driver 72 onto bus 102 as TXDATA for transmission to a destination circuit. The control of the TXDATA on bus 102 from the transmit interface driver 72 is controlled by protocol control signals TXCONTROL on lines 104.

The destination circuits and source circuits may be on-chip or off-chip. In addition both the receive interface driver 70 and the transmit interface driver 72 may interface with a plurality of source and destination circuits. The receive interface driver may include polling circuitry for determining the priority of a source attempting to send data to the system environment 78, and the protocol control signals RXCONTROL on lines 80 may include control signals for polling various sources. Similarly, the transmit interface driver 72 may include polling circuitry for determining the destination of the data to be transmitted, and for transmitting data to the destination having highest priority. The receive interface driver 70 and the transmit interface driver 72 may also include interrupt circuitry, such that if data being buffered therein for either transmission to or transmission from the system environment has a higher priority in terms of the address of its source or destination than other buffered data, then the data associated with the highest priority source/destination is transmitted first.

The system environment may comprise cell engines (in respect of which reference is made to The ATM Forum, Technical Committee. Utopia, An ATM-PHY Interface Specification, Level 2 Version 1.0 Nov. 21, 1996. AF-PHY-0039.000 Editors: Des YOUNG et al. ALANTEC, 70 Plumeria Drive, An Jose, Calif. 95134-2134), and may interface directly to individual devices via a plurality of receive and transmit dual port buffers. The dual port buffers may interface to a data-strobe serial link according to IEEE 1355, a central processor unit, or another system environment. The dual port buffers may also interface the system environment to a SDRAM.

All of the logic of the dual port buffer outside of the dual port RAM is fully scan testable. In addition, the dual port RAM is preferably fully accessible by one of the timing environments such that the dual port RAM may be tested for production purposes using a function test as opposed to a structural scan test or a built in self-test engine, which may be expensive to implement for a small dual port RAM. Any sort of structure test of the dual port RAM may be implemented.

What is claimed is:

1. Circuitry for transferring information from a first timing environment to a second timing environment, comprising:

a dual port RAM having a first port responsive to a first clock signal having a first clock speed and a second port responsive to a second clock signal having a second clock speed different from said first clock speed;

a first control circuit, responsive to the first clock signal, for controlling storage of data in the dual port RAM through the first port, and for generating a plurality of control signals indicating that data is stored in the dual port RAM;

a plurality of synchronizers each associated with a respective one of the control signals for synchronizing the respective control signals to the second clock signal; and a second control circuit, responsive to the second clock signal and the synchronized control signal, for controlling retrieval of stored data through the second port of the dual port RAM.

2. Circuitry according to claim 1 wherein the second control circuit generates a second control signal indicating that data has been retrieved from the dual port RAM, and further comprising a second synchronizer for synchronizing the second control signal to the first clock signal, wherein the first control circuit stores data in the dual port RAM responsive to the synchronized further control signal.

3. Circuitry according to claim 1 or claim 2, further comprising a receive buffer, wherein the second control circuit transfers data retrieved from the dual port RAM into the receive buffer.

4. Circuitry according to claim 1 or 2, further comprising a first buffer, wherein the first control circuit transfers data to be stored in the dual port RAM from the first buffer.

5. Circuitry according to claim 1 wherein the first control means includes a first address incrementer, data being stored in successive memory locations of the dual port RAM.

6. Circuitry according to claim 5 wherein the second control means includes a second address incrementer, data being retrieved from successive memory locations of the dual port RAM.

7. Circuitry according to claim 6 wherein the first and second address incrementers are cyclical.

8. Circuitry according to any one of claims 2 or 5 wherein the second control signal is synchronized to the first clock signal by a plurality of second synchronizers in series.

9. Circuitry according to claim 1 wherein each control signal is synchronized to the second timing signal by a plurality of synchronizers in series.

10. Circuitry according to claim 8 wherein the second control circuit generates a plurality of second control signals, the second synchronizers being one of a plurality of second synchronizers each associated with a respective one of the plurality of second control signals for synchronizing the respective second control signals to the first clock signal.

11. Circuitry according to claim 10 wherein each second control signal is synchronized to the first clock signal by a plurality of second synchronizers in series.

12. Circuitry according to claim 10 wherein the first control circuit generates the same number of control signals as the number of second control signals generated by the second control circuit.

13. Circuitry according to claim 1 wherein the first and second clock signals are derived from a common source.

14. Circuitry according to claim 1 wherein the first and second clock signals are asynchronous with respect to each other.

15. A method of transferring information from a first timing environment to a second timing environment, comprising the steps of:

storing data in a dual port RAM through a first port thereof responsive to a first clock signal having a first clock speed;

generating a plurality of control signals, responsive to the first clock signal, indicating that data is stored in the dual port RAM;

synchronizing the plurality of control signals to a second clock signal having a second clock speed different from said first clock speed through a plurality of synchronizers associated with a respective one of the plurality of control signals; and retrieving data from the dual port RAM through a second port thereof responsive to the second clock signal and the synchronized control signals.

16. The method of claim 15, further comprising the steps of:

generating a second control signal, responsive to the second clock signal, indicating that data has been retrieved from the dual port RAM; and synchronizing the second control signal to the first clock signal, wherein data is stored in the dual port RAM in dependence on the synchronized second control signal.

17. The method of claim 15 or 16, further comprising the step of buffering data prior to storage in the dual port RAM.

18. The method of claim 15, further comprising the step of buffering data after retrieval from the dual port RAM.

19. The method of claim 15 wherein the storing step stores data in successive locations of the dual port RAM.

20. The method of claim 19 wherein the retrieval step retrieves data from successive locations of the dual port RAM.

21. The method of claim 15 wherein the generating step generates a plurality of second control signals, and the synchronizing step synchronizes each of the plurality of second control signals.

22. The method according to claim 15 wherein the first and second clock signals are derived from a common source.

23. The method according to any one of claims 15 or 22 wherein the first and second clock signals are asynchronous with respect to each other.

24. An interface circuit for transmitting and receiving information to and from a system environment, comprising:

a receive dual port RAM having a first port responsive to a receive timing signal and a second port responsive to a system timing signal;

a first receive control circuit, responsive to the receive timing signal, for controlling storage of received data in the receive dual port RAM through the second port, and for generating a receive control signal indicating that received data is stored in the receive dual port RAM;

a second synchronizers for synchronizing the receive control signal to the system timing signal;

a second receive control circuit, responsive to the system timing signal, for controlling retrieval of stored received data through the second port of the receive dual port RAM in dependence on the synchronized receive control signal;

a transmit dual port RAM having a first port responsive to the system timing signal and a second port responsive to a transmit timing signal;

a first transmit control circuit, responsive to the system timing signal, for controlling storage of data to be transmitted in the transmit dual port RAM through the second port, and for generating a transmit control signal indicating that data is stored in the transmit dual port RAM;

a first synchronizers for synchronizing the transmit control signal to the transmit timing signal; and a second transmit control circuit, responsive to the system timing signal, for controlling retrieval of stored data to be transmitted through the second port of the transmit dual port RAM in dependence on the synchronized transmit control signal.

25. The interface according to claim 24 wherein the second receive control circuit generates a second receive control signal indicating that received data has been retrieved from the receive dual port RAM, and further comprising a second synchronizers for synchronizing the second receive control signal to the receive timing signal, wherein the first receive control circuit stores received data in the receive dual port RAM responsive to the synchronized second receive control signal, and wherein the second transmit control circuit generates a second transmit control signal indicating that data to be transmitted has been retrieved from the transmit dual port RAM, and further comprising a second first synchronizers for synchronizing the further transmit control signal to the system timing signal, wherein the first transmit control circuit stores data in the transmit dual port RAM responsive to the synchronized second transmit control signal.

26. The interface circuit of claim 24 or claim 25 wherein the system timing signal, received timing signal and transmit timing signal are system, receive, and transmit clocks respectively.

27. A circuit for transferring information from a first timing environment to a second timing environment, comprising:

a dual port RAM having a first port responsive to a first timing signal and a second port responsive to a second timing signal;

a first control circuit, responsive to the first timing signal, for controlling storage of data in the dual port RAM through the first port, and for generating a plurality of control signals indicating that data is stored in the dual port RAM;

a plurality of synchronizers, each of the plurality of synchronizers associated with a respective one of the plurality of control signals for synchronizing the respective control signals to the second timing signal; and a second control circuit responsive to the second timing signal and the synchronized control signals for controlling retrieval of stored data through the second port of the dual port RAM.

28. The circuit of claim 27, wherein each control signal is synchronized to the second timing signal by a plurality of synchronizers in series.

29. A circuit for transferring information from a first timing environment to a second timing environment, comprising:

a dual port RAM having a first port responsive to a first timing signal and a second port responsive to a second timing signal;

a first control circuit, responsive to the first timing signal, for controlling storage of data in the dual port RAM through the first port, and for generating a plurality of control signals indicating that data is stored in the dual port RAM;

a plurality of first synchronizers, each associated with a respective one of the plurality of control signals, for synchronizing the respective control signals to the second timing signal;

a plurality of second synchronizers in series for synchronizing each of the control signals to the second timing signal; and a second control circuit responsive to the second timing signal and the synchronized control signal for controlling retrieval of stored data through the second port of the dual port RAM, the second control circuit configured to generate a plurality of second control signals associated with the respective one of the plurality of second synchronizers synchronizing the respective second control signals to the first timing signal.

30. The circuit of claim 29 wherein each second control signal is synchronized to the first timing signal by the plurality of second synchronizers configured in series.

31. The circuit of claim 29 wherein the first control circuit generates the same number of control signals as the number of second control signals generated by the second control circuit.

32. A method of transferring information from a first timing environment to a second timing environment, comprising:

storing data in a dual port RAM through a first port thereof responsive to a first timing signal;

generating a plurality of first control signals, responsive to the first timing signal, indicating that data is stored in the dual port RAM and generating a plurality of second control signals;

synchronizing each of the plurality of first control signals to the second timing signal and synchronizing the plurality of second control signals to the second timing signal; and retrieving data from the dual port RAM through a second port thereof responsive to the second timing signal and the synchronized plurality of first and second control signals.

* * * * *

UNITED STATES PATENT AND TRADEMARK OFFICE
CERTIFICATE OF CORRECTION

PATENT NO. : 6,249,875 B1 Page 1 of 1
DATED : June 19, 2001
INVENTOR(S) : Robert Warren It is certified that error appears in the above-identified patent and that said Letters Patent is hereby corrected as shown below:

<u>Title page,</u>
Item [73], "STMicroelectronics S.r.l., Agrate Brianza (IT)" should read as
-- STMicroelectronics Ltd., Almondsbury (GB) --.

Signed and Sealed this

Tenth Day of December, 2002

JAMES E. ROGAN
*Director of the United States Patent and Trademark Office*